(12) United States Patent
Grobshtein et al.

(10) Patent No.: US 8,178,848 B2
(45) Date of Patent: May 15, 2012

(54) SYSTEMS AND METHODS FOR FILTERING NOISE IN PIXELATED IMAGE DETECTORS

(75) Inventors: Yariv Grobshtein, Haifa (IL); Ruben Brenner, Nesher (IL); Lana Volokh, Haifa (IL); Jean-Paul Bouhnik, Zichron Yaacov (IL)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 12/643,761

(22) Filed: Dec. 21, 2009

(65) Prior Publication Data

US 2011/0147599 A1 Jun. 23, 2011

(51) Int. Cl.
*H01L 27/146* (2006.01)

(52) U.S. Cl. .................................. 250/370.09

(58) Field of Classification Search ............ 250/370.01–370.15; 378/98.8, 378/19
See application file for complete search history.

(56) References Cited

U.S. PATENT DOCUMENTS

| | | | |
|---|---|---|---|
| 4,905,265 A | 2/1990 | Cox et al. | |
| 6,169,287 B1 | 1/2001 | Warburton | |
| 6,901,173 B2 | 5/2005 | Alderson et al. | |
| 7,026,621 B2 | 4/2006 | Stonger et al. | |
| 7,106,371 B1 | 9/2006 | Kubo et al. | |
| 7,368,697 B2 | 5/2008 | Moody et al. | |
| 7,378,663 B2 | 5/2008 | Gros D'Aillon et al. | |
| 7,583,790 B2 * | 9/2009 | Hoffman et al. | 378/98.8 |
| 7,606,347 B2 * | 10/2009 | Tkaczyk et al. | 378/19 |
| 7,634,060 B2 * | 12/2009 | Hoffman et al. | 378/98.8 |
| 7,697,659 B2 * | 4/2010 | Hoffman et al. | 378/19 |
| 2006/0169905 A1 | 8/2006 | Wenstrand | |
| 2009/0008564 A1 * | 1/2009 | Balan et al. | 250/366 |
| 2009/0012745 A1 | 1/2009 | Longman et al. | |

OTHER PUBLICATIONS

Riendeau et al., "High rate photon counting CT using parallel digital PET electronics," 2008, IEEE Transactions on Nuclear Science, vol. 55, No. 1, pp. 40-47.*

* cited by examiner

*Primary Examiner* — Kiho Kim
(74) *Attorney, Agent, or Firm* — The Small Patent Law Group; Dean D. Small (57) ABSTRACT

Systems and methods for filtering noise in pixelated photon counting image detectors are provided. One method includes obtaining image information including event count information for a pixelated solid-state photon counting radiation detector and obtaining a count-rate threshold. The method further includes filtering the event count information based on the count-rate threshold.

24 Claims, 7 Drawing Sheets

SYSTEMS AND METHODS FOR FILTERING NOISE IN PIXELATED IMAGE DETECTORS

BACKGROUND OF THE INVENTION

The subject matter disclosed herein relates generally to image detectors, and more particularly to systems and methods for filtering noise in the pixelated image detectors.

Detectors for diagnostic imaging systems, for example, detectors for single photon emission computed tomography (SPECT) and computed tomography (CT) imaging systems are often produced from semiconductor materials, such as cadmium zinc telluride (CdZnTe), often referred to as CZT, cadmium telluride (CdTe) and silicon (Si), among others. These semiconductor detectors typically include arrays of pixelated detector modules. These detector modules and/or the components thereof (e.g. application specific integrated circuits (ASICs)) may not operate properly, either continuously or intermittently. This improper operation can cause significant problems during steps of the semiconductor-based imaging device production. If such module behavior is detected at the detector screening/system manufacturing stages, the module will be discarded, thereby resulting in a decreased production yield.

For an imaging system that is in use, a module may be incorrectly generating faulty or invalid information, for example incorrect photon counts in a nuclear medicine (NM) imaging system that may be detected as clinically relevant energies, and added to the acquired image. Such modules may cause significant image artifacts, thereby decreasing image quality and reducing the reliability of image acquisition results and any analysis of these images thereafter. In NM applications where energy discrimination is important or critical, such modules may decrease device ability to differentiate between imaging isotopes.

BRIEF DESCRIPTION OF THE INVENTION

In accordance with various embodiments, a method for image noise filtering is provided. The method includes obtaining image information including event count information for a pixelated solid-state photon counting radiation detector and obtaining a count-rate threshold. The method further includes filtering the event count information based on the count-rate threshold.

In accordance with other embodiments, a method for noise filtering of image data is provided. The method includes acquiring image data in a count mode of a pixelated imaging detector and determining a count-rate for the count mode image data. The method further includes filtering the count mode image data based on count-rate spikes.

In accordance with yet other embodiments, an imaging system is provided that includes at least one pixelated detector configured to operate in a count mode and a processor configured to receive image data sets from the at least one pixelated detector. The image data sets include event count information. The imaging system further includes a noise filtering module configured to filter the event count information based on count-rate spikes determined from the event count information.

DETAILED DESCRIPTION OF THE INVENTION

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for detection and correction of faulty events generated by detector modules, particularly detector modules having pixelated detector elements. In general, various embodiments detect spurious events according to a measured count-rate, which may be a currently measured count-rate, an instantaneous count rate or a stored count rate, and filter out these events from the reconstructed image. In some embodiments, typically noisy events, which are events observed as spikes of high count-rate, are identified as events with significantly higher than a normal count rate. Because of the difference in the count-rate, which is often significant, the irregular high count-rate instances are detected and the events that arrived at these times are filtered out. The various embodiments may be implemented, for example, as an electronic noise filter for pixelated detectors.

In some embodiments, the methods described herein dynamically determine a count-rate threshold (e.g., a maximum count-rate threshold) for identifying real or valid events based on a representative count rate and an acceptable deviation therefrom. Thereafter, time periods (timestamps) with a greater rate than the threshold are considered noise, such that events (e.g., photon counts) arriving or detected at such timestamps are discarded. In order to compensate for the discarded events, data normalization may later be performed.

The various described methods can be used to detect and filter faulty or invalid events, for example, in clinical scans during the acquisition ("online") or after the scan has already been acquired ("offline"). Additionally, the various methods can be used for other applications such as quality control (QC), detector module testing and screening, and system monitoring and tracking, among others.

A technical effect of at least one embodiment is reducing image noise such that image artifacts are reduced, which may allow improved clinical diagnosis. Additionally, the requirements for acceptable detector modules and the environmental conditions (e.g., temperature and humidity) under which the detector can operate may be reduced or lessened.

Figure 1:
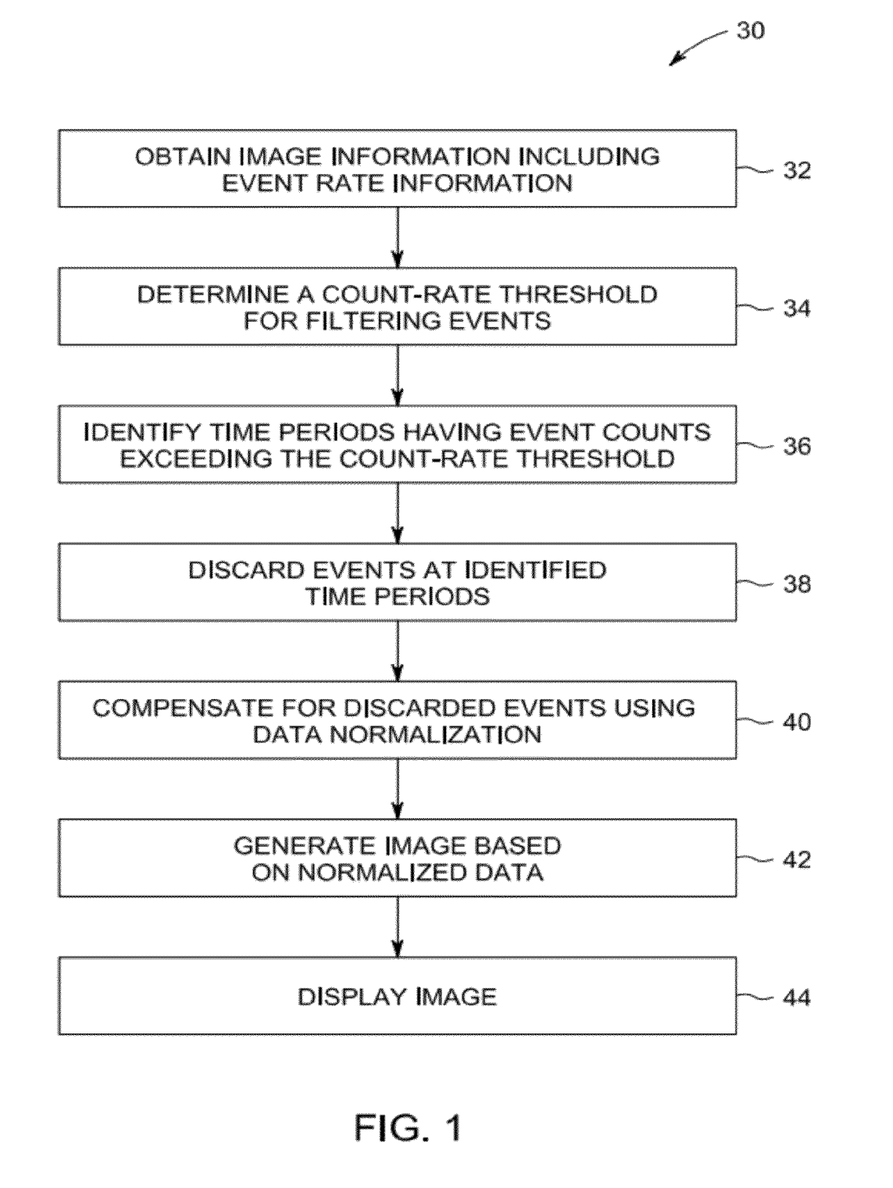
FIG. 1 is a flowchart of a method for filtering image noise in accordance with various embodiments.

Specifically, various embodiments provide a method 30 as illustrated in FIG. 1 for filtering image noise, such as noise in image data from imaging detectors, particularly pixelated detectors. The method 30 includes obtaining image information at 32, which may be raw image information from an imaging detector that acquires image data in a counting or count mode, namely an event by event mode. For example, photon count information from a nuclear medicine (NM) scan, a Positron Emission Tomography (PET) scan, a planar x-ray scan or an x-ray computed tomography (CT) scan may be obtained. The information may be currently acquired information, for example, from a current ongoing image acquisition scan or may be stored information. Different types of stored information may be used, for example, stored list mode data of one or more scans.

Figure 2:
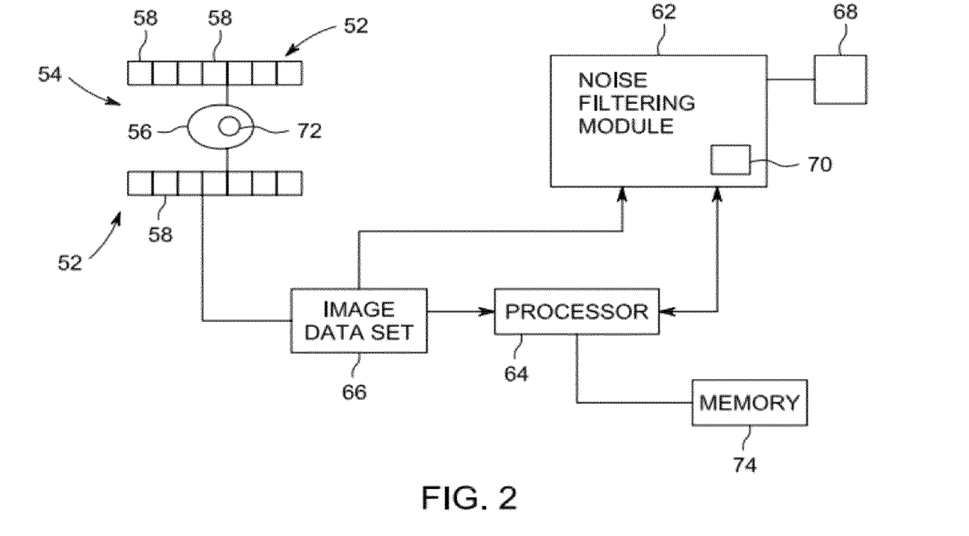
FIG. 2 is a block diagram of an imaging system having a noise filtering module for filtering image noise in accordance with various embodiments.
Figure 3:
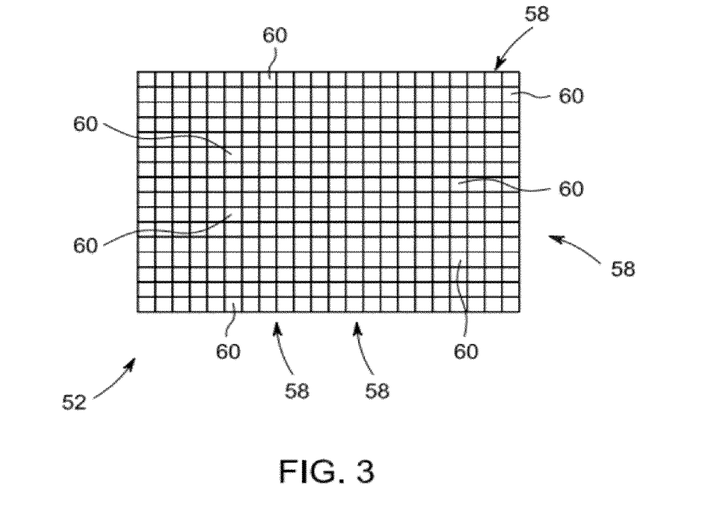
FIG. 3 is a diagram illustrating a pixelated imaging detector having a plurality of modules for use in the imaging system of FIG. 2.

The image information may be acquired, for example, by an imaging system 50 as shown in FIG. 2. The exemplary imaging system 50 includes one or more detectors, such as a pair of detectors 52 having a central opening 54 therethrough. The opening 54 is configured to receive an object therein, such as a patient 56. In other exemplary embodiments, the plurality of detectors 52 include (e.g., are fitted or installed with) pinhole collimators that are arranged about the object to be imaged, such as the patient 56 or a region of interest (e.g., an organ) of the patient 56. The detectors 52 are pixelated detectors configured to operate in an event counting mode. The pixelated detectors 52 may be configured to acquire single photon emission computed tomography (SPECT) and/or CT image data. The detectors 52 may be solid-state detectors and/or may be formed from different materials, particularly semiconductor materials, such as cadmium zinc telluride (CdZnTe), often referred to as CZT, cadmium telluride (CdTe), and silicon (Si), among others. In some embodiments, a plurality of detector modules 58 are provided, each having a plurality of pixels 60 a shown in FIG. 3 and forming a detector 52.

The imaging system 50 also includes a noise filtering module 62 that implements the various embodiments, including the method 30 (shown in FIG. 1). The noise filtering module 62 may be implemented in connection with or on a processor 64 (e.g., workstation) that is coupled to the imaging system 50. Optionally, the noise filtering module 62 may be implemented as a module or device that is coupled to or installed in the processor 64. During operation, the output from the detectors 52, which may be one or more image data sets 66, is transmitted to the noise filtering module 62. The noise filtering module 62 is configured to utilize the image data set 66, and in particular, event counts that are part of the image data set 66 to identify and remove noise related imaging artifacts from the image data set 66 to form a reduced noise image 68. More specifically, in the exemplary embodiment, the noise filtering module 62 uses event counts to determine a threshold for filtering noise from the image data set 66, which may be provided by a threshold determination module 70. The noise filtering module 62 and/or the threshold determination module 70 may be implemented as a set of instructions or an algorithm installed on any computer that is coupled to or configured to receive the image data set 66, for example a workstation coupled to and controlling the operation of the imaging system 50.

Figure 4:
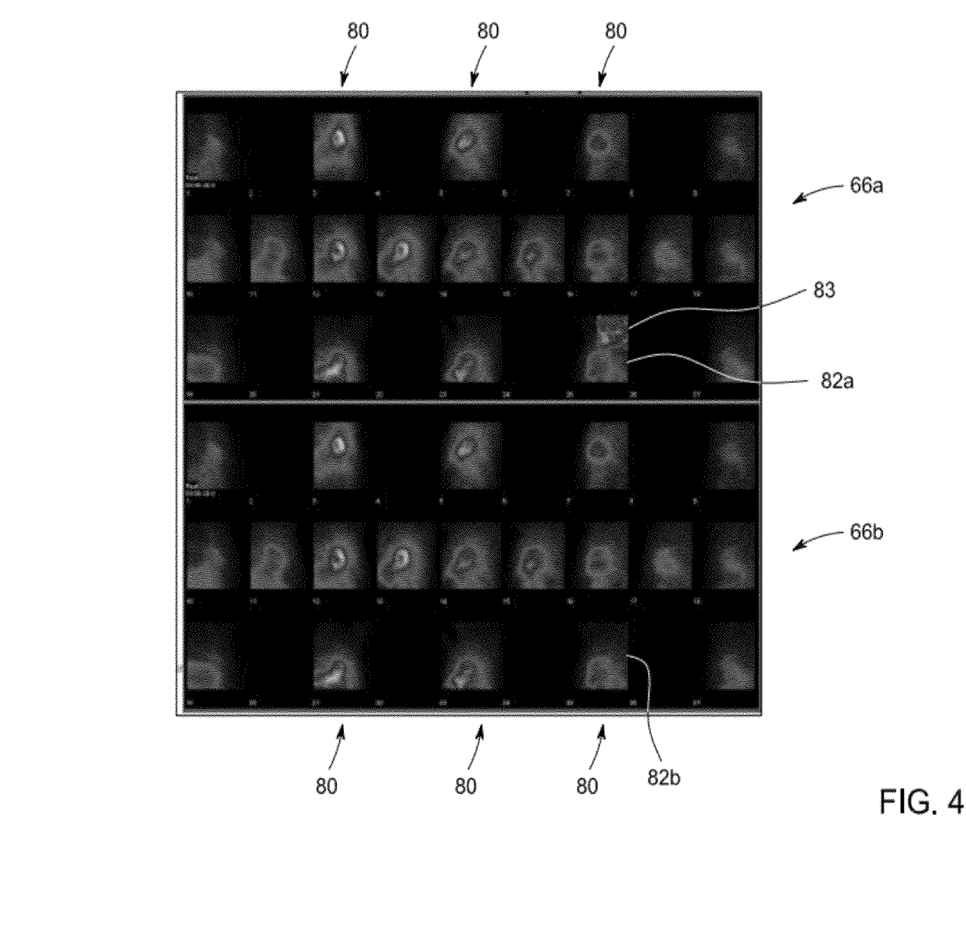
FIG. 4 shows image sets having a plurality of images illustrating image noise filtering in accordance with various embodiments.

Thus, for example, event count information, such as photon count information from a region of interest 72 (e.g., heart) of the patient 56 is obtained from the modules 58 of the detectors 52. FIG. 4 depicts an exemplary data set 66 acquired by a multi-pinhole nuclear camera having twenty-seven pinholes. Each pinhole is associated with an array of 2×2 CZT modules. The pinholes were aimed at the heart of the patient 56 injected with radiopharmaceutical and thus, each image depicts a different view of the isotope distribution in the patient 56. In the depicted example, some of the arrays (e.g., array numbers 2, 4, 6, 8, 20, 22, 24, and 26) were not populated with detectors, thus the corresponding images are empty.

The image data set 66, which may include raw image data for a plurality of modules 58 of the detectors 52, may be reconstructed into a plurality of images 80, illustrated as SPECT images of a heart. The raw image data, before filtering in accordance with various embodiments, may include images 80, such as the image 82a in the data set 60a having noise (corresponding to the "hot" colored region 83). It should be noted that each of the images 80 corresponds to a reconstructed image from one or more of the plurality of modules 58 of the detectors 52. For example, each image 80 may correspond to a view of a heart of the patient 56 (shown in FIG. 2) associated with different image projections, such as from different imaging angles.

Thus, at least some of the acquired data sets 60 include, for example, image projection sets acquired with "noisy" modules 58. The various embodiments filter the data corresponding to the "noisy" modules to produce a filtered image projection set. Accordingly, as illustrated in the data set 60b, the noise has been reduced and/or eliminated from the image 82b, which no longer has the "hot" colored region 83.

It should be noted that the raw data, such as the image data sets 66, or filtered data having noise removed according to the various embodiments, may be stored for a short term (e.g., during processing) or for a long term (e.g., for later offline retrieval) in a memory 74. The memory 74 may be any type of data storage device, which may also store databases of information. The memory 74 may be separate from or form part of the processor 64.

Referring again to the method 30 of FIG. 1, a count-rate threshold for filtering the event data, and in particular, event counts is determined at 34. It should be noted that this determination, as well as the filtering accomplished by the method 30 may be performed while the image information is being acquired (in an online process) or after the image information has been acquired and stored (in an offline process). The count-rate threshold may be defined as a maximum number of event counts, such as a maximum number of emission photon counts from a radiopharmaceutical that is decaying in an organ of interest within the patient, which correspond to valid events. It should be noted that the emission photon counts are not limited to decay of a radiopharmaceutical from an organ of interest, but may include, for example, phantom scans for system tests, calibrations, QC, etc.

Alternatively or optionally, thresholding for filtering the event data, and in particular, event counts may be determined by the acquisition type. For example, a maximum expected count rate may be established by clinical experience, for example, for cardiac imaging, for a bone scan, etc. These established maximal rates may be used for determining a threshold value (e.g., three times that rate). The threshold rate may be associated with the type of acquisition and become operational when the acquisition type is selected by the operator. Alternatively or optionally, a fixed threshold for filtering the event data may be set.

In general, a count-rate, which may be a currently acquired and/or instantaneous or near instantaneous count-rate, is used to filter event counts to remove spurious events, for example, noisy events that are identified as spikes of high-counts. The spikes are count-rates that are higher, such as significantly higher, than a normal or representative count-rate.

Figure 5:
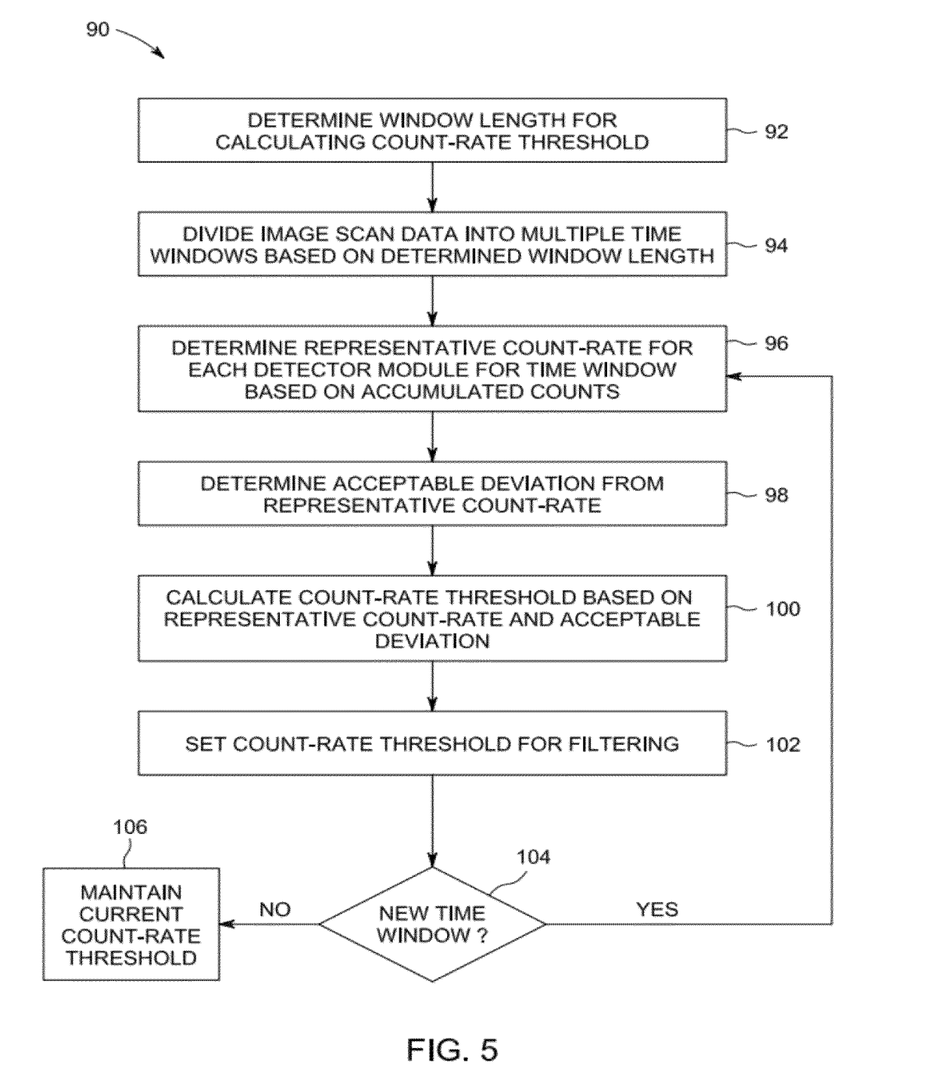
FIG. 5 is a flowchart of a method for determining a count-rate threshold for filtering image noise in accordance with various embodiments.

More particularly, the count-rate threshold may be determined using the method 90 shown in FIG. 5. It should be noted that the count-rate threshold may be dynamically determined and set. Accordingly, the count-rate threshold may be changed during acquisition of image data or during the image reconstruction process using stored image data. The method 90 includes determining a window length at 92 for use in calculating the count-rate threshold and defining a time period for use in the calculation. For example, in a particular data set of a certain length, a predetermined or minimum number of windows may be determined as desired or needed. Accordingly, the window length may be determined as an amount of time such that the total scan time is divided into the predetermined or minimum number of windows. For example, in a data set having event count information for a three minute scan, the window length may be five seconds, ten seconds, etc. However, the window length may be shortened or lengthened, which may be performed dynamically, such as during a scan or image reconstruction. The window length may also be determined based on a number of count acquisition periods for each window or a predetermined number of minimum counts for each window. A user may also adjust the window length as desired or needed. In various embodiments, the window length should be short enough to have multiple windows per data set, but long enough to obtain statistically relevant data. The window length may be preset, for example, based on the type of imaging scanner being used and which may be determined based on previous scan data.

The image scan data is then divided into multiple time windows at 94 based on the determined window length. For example, in a data set having event count information for a three minute scan and wherein the window length is five seconds, the event count information is divided into 36 time windows with each window having event count information for that portion of the scan. The determination of a count-rate threshold may then be determined based on the count-rate information, such as the count-rate information for each window or a plurality of windows, for example, based on an average of the plurality of windows.

It should be noted that the windows may overlap such that window_length X num_of_windows≠scan_time. For example, a "sliding" window may be used, such as a window of five seconds in length that starts from time=0 s to time=5 s, then the window moves to the range time=1 s to time=6 s, then moves to the range time=2 s to time=7 s and so on. Thus, the number of windows times the time period for each window does not necessarily equal the total scan time. However, in embodiments where the windows are not overlapping, the number of windows times the time period for each window does equal the total scan time.

At 96 a determination is made as to a representative count-rate for each detector module for one or more time windows based on the accumulated counts during the one or more time windows. Accordingly, the determination in various embodiments is made separately for each of the detector modules. It should be noted that all events in the time window are considered, for example, all photon counts at all energies are considered. In particular, the number of event counts for each count detection period within the time window, which events may be counted every one millisecond, is determined. The count detection period may be determined based on the counting capabilities of the imaging detectors. Thus, the number of event counts for each count detection period is determined. For example, the count-rate for each detection period may be several counts, except for the noisy events. Based on the count rates for each detection period (which may or may not include the noisy events) a representative count-rate is determined. It should be noted that an initial representative count-rate may be preset, for example, based on a known average count level for the detector. In some embodiments, the initial representative count-rate may be determined based on an average saturation-level rate for the detector module. In other embodiments, or thereafter, the representative count-rate may be determined based on an average of the accumulated counts for each detection period within the time window. For example, if an approximately equal number of detection periods include event counts of 1, 2 and 3, the representative count-rate may be set to 2.

Thereafter, a deviation, such as an acceptable deviation from the representative count-rate is determined at 98. For example, if the representative count-rate is two, an acceptable deviation may be one-hundred percent of the representative count-rate, namely two. The deviation is not necessarily based on fixed percentage or fixed number of events compared with the representative rate, but may be dependant on the value of the representative rate (e.g., each value of representative rate will have a particular deviation). The deviation may be based on a predetermined acceptable range, which deviation may be based on the expectation for Poisson distributed data. It should be noted that that in some embodiments, all event counts in all detection periods are used for the calculation. In other embodiments, only event counts below a predetermined maximum rate are used for the calculation.

A count-rate threshold is then calculated at 100 based on the representative count-rate and the deviation. Thus, continuing with the example above, if the representative count-rate is two and the acceptable deviation is two, the count-rate threshold is calculated to be four. Accordingly, the count-rate threshold for this time window for the particular detector module is set at 102 to four. Thus, filtering within the time window, or one or more subsequent time windows (as described in more detail below), is performed using a count-rate threshold of four.

Referring again to the method 90, a determination is then made at 104 as to whether there is another time window with event count information. For example, a determination is made as to whether there are still other time windows in the data set of interest. If there are no new or additional time windows, then the current count-rate threshold is maintained at 106. If new or additional time windows exist, a representative count-rate is determined at 96. It should be noted that the representative count-rate may be determined based on the event counts for the additional or new window only, or may also use the event counts from one or more previous windows, such as in an average or statistical manner.

In some embodiments, the count-rate threshold is determined for each module m and time-window tw of size w milliseconds (ms) as follows:

```
k ← nth percentile of 1ms event-rate <= s in tw
Thresh[m,tw] ← min t s.t. poission cdf (X=t,λ=k+1) >= p
If k > typical expected count-rate r  // suspected as noise
    i←k
    do
        find min t s.t. poission cdf (X=t,λ=i+1) >= p
        vmr ← var/mean of 1ms event-rate <= t in tw
        if vmr within [1−d, 1+d]
            Thresh[m,tw] ← t
            break
        else
            i←i−1
    while i>=1
    If i<1 Thresh[m,tw] ← min t s.t. poission cdf (X=t,λ=1) >= p
```

The parameters in various embodiments are defined as follows, with assigned or predetermined values for one embodiment shown in brackets:
  w: size (in ms) of each time window [500]
  n: percentile for a "representative" event-rate within the time-window [50% (median)]
  s: maximum allowed count rate [99]
  p: minimal required Poisson cumulative distribution for the "representative" λ [99.5%]
  r: maximal un-suspected count-rate value [4]
  d: accepted deviation from expected VMR ratio of 1 [50%]

Figure 6:
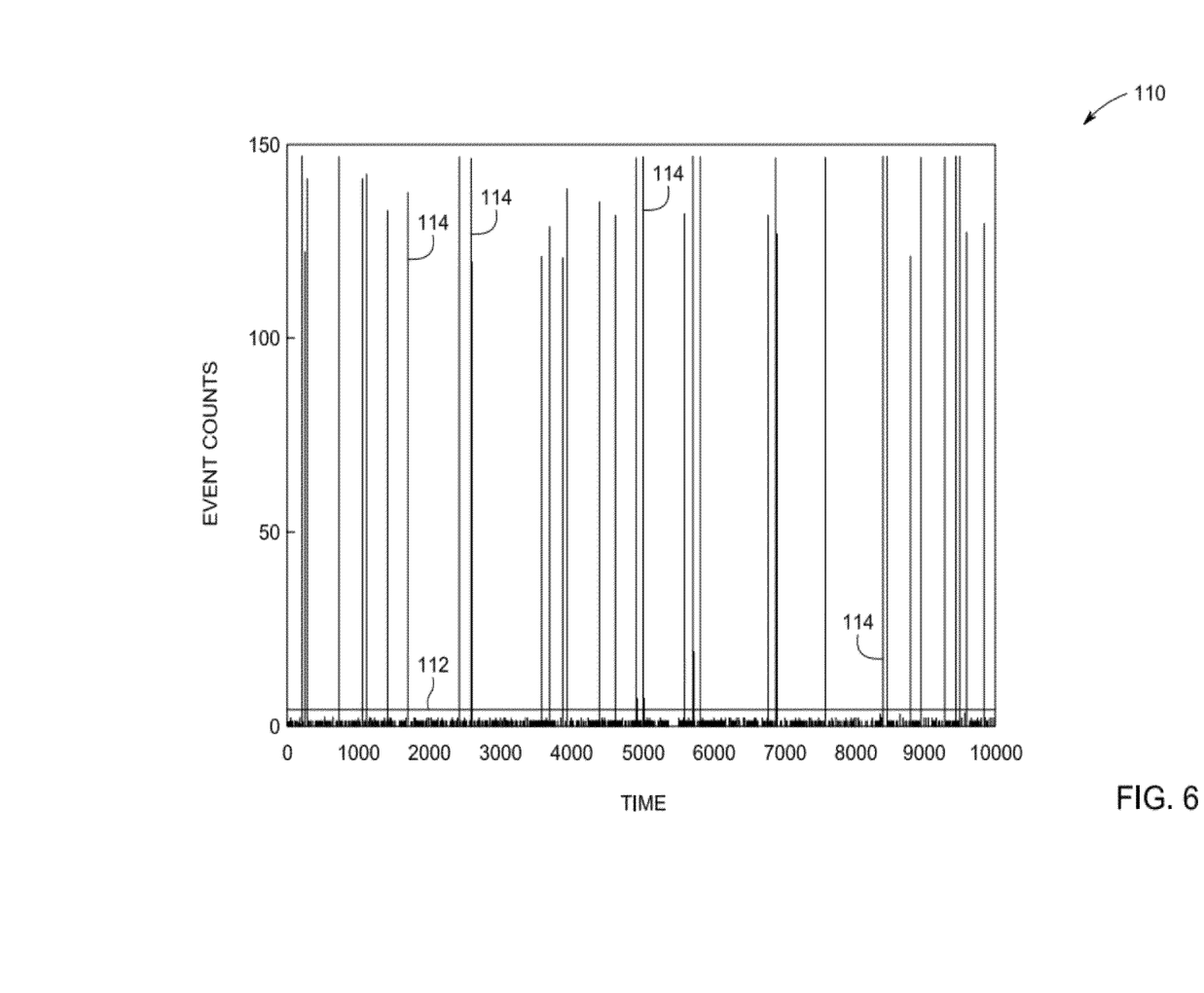
FIG. 6 is a graph illustrating count-rate spikes in acquired image count data.

Referring again to the method 30 of FIG. 1, after the count-rate threshold is determined at 34 as described above, time periods having event counts exceeding the count-rate threshold are identified at 36. The time period evaluated in various embodiments corresponds to detection periods of the detectors, which are time periods in which counts are measured, such as every 1 ms. Thus, as shown in the graph 110 wherein the vertical axis represents event counts (e.g., photon counts) for all pixels in a particular detector module and the horizontal axis represents time (illustrated as 10 seconds) for a particular time window as described herein, each time period having a count rate exceeding the count-rate threshold, shown by the line 112 (representing a count of four events), is identified. As can be seen in the graph 110, a plurality of count rates exceed the count-rate threshold and include a plurality of count-rate spikes 114. It should be noted that only four spikes 114 are identified in the graph 100 for simplicity although the method 30 identifies all detection time periods wherein the count rate exceeds the count-rate threshold value. It should be noted that some detector modules are subdivided into sub-units. For example, a detector module may comprise a plurality of application specific integrated circuits (ASICs), or may comprise a plurality of semiconductor crystals. In these cases, analysis and count rejection may be performed on sub-unit basis.

Referring again to the method 30, the counts for the events within each of the detection periods that exceed the count-rate threshold are discarded at 38. For example, the counts in each of the count-rate spikes 114 in the graph 110 (both shown in FIG. 6) are discarded and accordingly are removed from the image reconstruction process.

Figure 7:
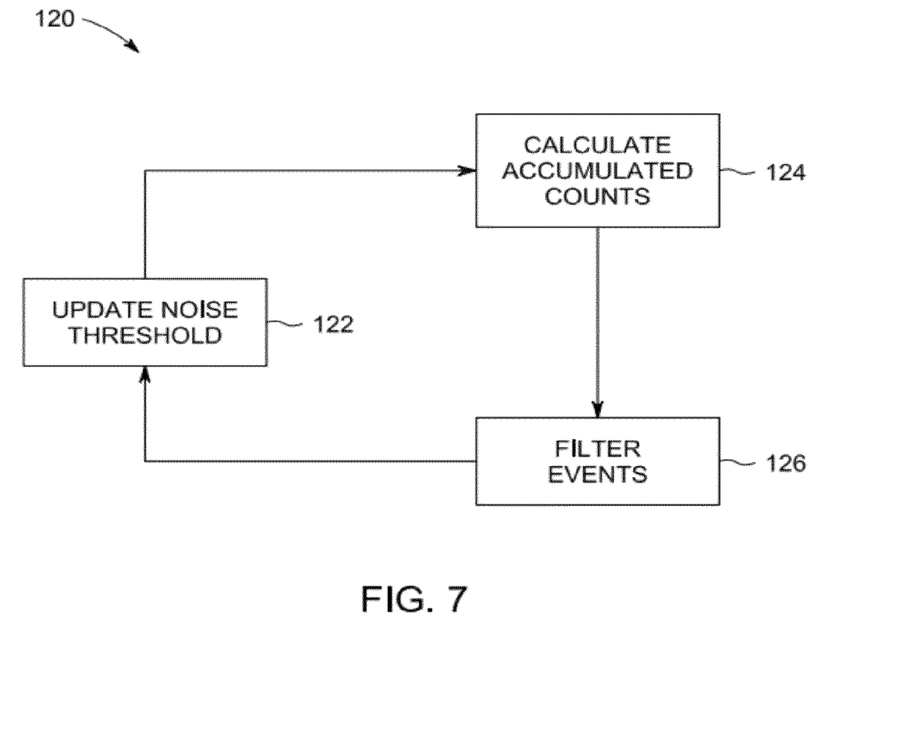
FIG. 7 is a simplified block diagram illustrating a process for noise filtering in accordance with various embodiments.

Thus, as shown in FIG. 7, for each detection period of the detector module, for example, for every 1 ms, an iterative process 120 may be performed. In particular, and as described in more detail above, a noise threshold is updated at 122, which includes updating the count-rate threshold. Thereafter, the accumulated counts are calculated at 124 and the event filtered at 126, for example, event counts exceeding the noise threshold are discarded or removed.

It should be noted that in an online mode of operation, in various embodiments, the described methods are active in persistence from a first image frame, such as a first image frame displayed to a user. As the history of, for example, 500 ms time windows are needed, the first 500 ms window after a user requests the filtering is used to obtain count statistics with no frames updates, namely a 500 ms delay to the first shown frame. Thereafter, persistence statistics continue to "roll" when the scan is started, thereby defining a sliding window. A user may clear or reset the time window statistics history, which may also have a 500 ms delay. In various embodiments, the statistics windows are updated continuously even if scan is paused.

Referring again to the method 30 of FIG. 1, thereafter data normalization may be performed at 40 to compensate for the discarded events. For detector modules having counts from less than the total scan time because certain counts were discarded as described herein, the data for that detector module may be normalized by the total time when event counts were discarded. For example, during a ten second total acquisition time, if there were 300 detection periods (or bursts) each totaling 1 ms and 300 ms of counts were discarded, then the total time having counts is 9.7 seconds. Accordingly, in some embodiments, the number of counts for each pixel for that detector module is adjusted or normalized. In particular, for each pixel, the number of counts may be multiplied by a scaling factor determined by the amount of time the detector module had events discarded. Following the example above, the event counts detected by each pixel are normalized by multiplying the event counts by 10/9.7 or about 1.03.

Thus, data normalization may be performed as follows:
1. When "spike" in one module is detected, only events attributable to that module are discarded.
2. Number of filtered timestamps (spikes) is counted for each module per output "time window" (for all energy sets).
3. For each module in each window a normalization factor is calculated by: fullTime/(fullTime−spikeTime)
4. The pixels in each module section in each time window are multiplied by the normalization factor upon time window completion.

It should be noted that the normalization is performed separately for the "summed" image and, for example, in a cardiac image, for each of a plurality of gated bins (based on cardiac signals). It should be noted that the normalization is the "average" and not rate dependent and, thus, will be inaccurate if the rate changes along the time within the time window. In such cases, dynamic time windows of shorter duration may be used as described in more detail herein.

Referring again to FIG. 1, thereafter one or more images may be generated at 42 based on the normalized data. The image reconstruction process used to generate the images may be performed in any suitable manner, for example, using iterative image reconstruction methods in the art. The reconstructed then may be displayed at 44.

Accordingly, and following the example above, event count rates for a particular detection period that exceed four are filtered such that the all counts for that detection period for that detector module are discarded. For example, if a noisy detector module intermittently has event count spikes, for example, that exceed the count-rate threshold, the event counts during the spike time period are filtered and discarded, such that the event counts are removed and not used during the image reconstruction process. For example, as shown in FIG. 4, the noisy detector module(s) corresponding to the image 82a are filtered such that the image 82b with reduced noise is generated.

Figure 8:
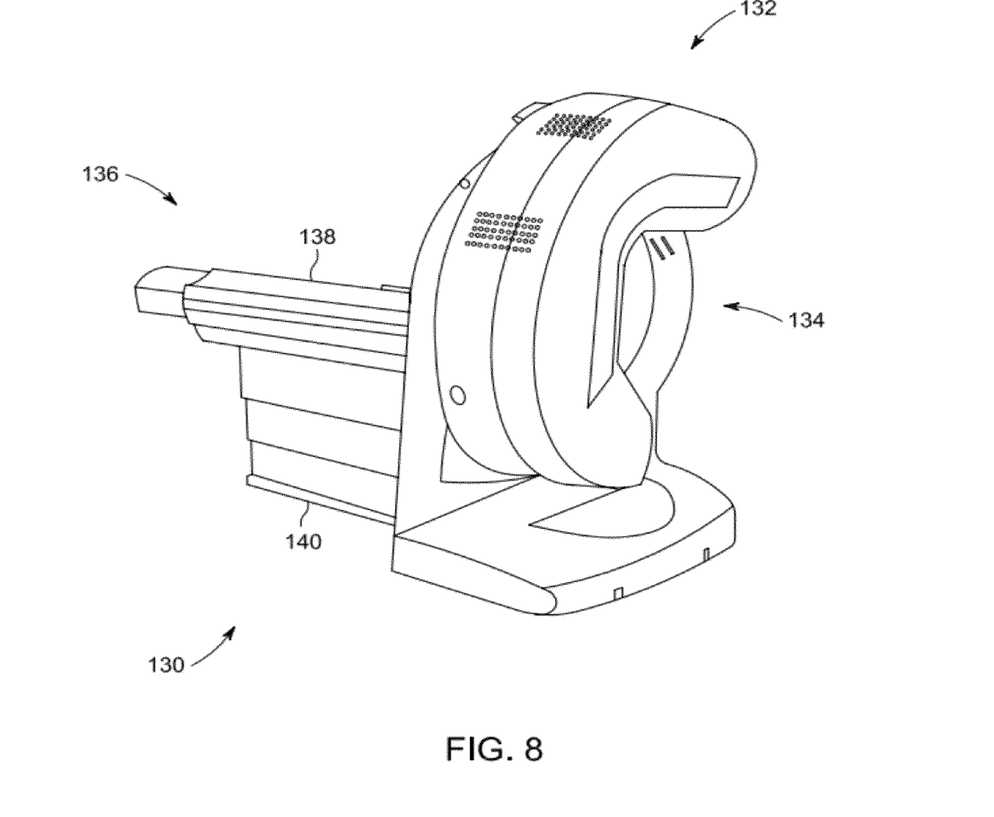
FIG. 8 is a perspective view of a nuclear medicine (NM) imaging system in which various embodiments may be implemented.

The various embodiments may be implemented in connection with any system detecting event counts, for example, diagnostic imaging system using pixelated detectors, such as CZT detectors to detect event counts (e.g., SPECT or x-ray CT counts). For example, as shown in FIG. 8, the imaging system may be an NM imaging system 130, which is shown embodied as a SPECT imaging system. The system 130 includes an integrated gantry 132 having a gantry central bore 134. The gantry 132 is configured to support one or more NM radiation detectors, which may be configured as CZT imaging modules, for example, the pair of detectors 52 (shown in FIG. 2) that are supported, for example, around 180 degrees of the gantry 132. In such a configuration, the system may include multiple imaging detectors with pinhole collimators that are arranged about the object to be imaged, instead of two detectors spaced apart 180 degrees. It should be noted that the NM radiation detectors may be supported around more or less of the gantry 132, for example, around the entire 360 degrees of the gantry 132. Thus, the radiation detectors are arranged around the gantry central bore 134 defining an examination axis.

A patient table 136 may include a bed 138 slidingly coupled to a bed support system 140, which may be coupled directly to a floor or may be coupled to the gantry 132 through a base coupled to the gantry 132. The bed 138 may include a stretcher slidingly coupled to an upper surface of the bed 138. The patient table 136 is configured to facilitate ingress and egress of a patient (not shown) into an examination position that is substantially aligned with the examination axis of the gantry central bore 134. During an imaging scan, the patient table 136 may be controlled to move the bed 138 and/or stretcher axially into and out of (as well as upward and downward within) the gantry central bore 314 to obtain event count information for the patient or a region of the patient. The operation and control of the imaging system 130 may be performed in any manner known in the art. It should be noted that the various embodiments may be implemented in connection with imaging systems that include stationary gantries or moving gantries.

Thus, various embodiments detect and correct for faulty events generated by detector modules. Spurious events may be detected according to a measured count-rate, and the spurious events filtered from the image. The various embodiments may be implemented in different applications. For example, in an imaging system that is on site and installed, a detector module may be incorrectly generating faulty counts that may be detected at clinically relevant energies and added to the acquired image. Such modules may cause significant image artifacts in the reconstructed slices, thereby decreasing image quality and reducing the reliability of image acquisition results and any analysis of these images. In situations when energies discrimination is needed, such modules may decrease device ability to differentiate between isotopes. The various embodiments may correct the faulty counts as described in more detail herein.

As another example, the spectrum of a module generating spurious events is different than a typical spectrum of the common imaging isotopes. In particular, the "peak" location is different (usually located in relatively lower energies range). If a module is noisy during acquisition of an energy update procedure (e.g., part of a periodic QC check) the module peak will be detected in the wrong position, which will lead to wrong energy correction. As a result, images of all the subsequent scans (until the next re-calibration) will be incorrect. The various embodiments may correct the faulty counts as described in more detail herein.

The various embodiments may be implemented, for example, in testing and screening of modules in the manufacturing stage, such as to detect faulty modules in earlier stages, before shipping, as well as enabling the screening requirements to be reduced or lessened (because noisy modules up to some level can be efficiently corrected on the fly). Also, the various embodiments may be implemented, for example, as part of QC procedures in the field and for monitoring, tracking and preventive maintenance of the systems in the installed base.

It should be noted that the various embodiments may be implemented in hardware, software or a combination thereof. Additionally, modifications and variations are contemplated. For example, the methods described herein and implemented in connection with each detector module may also be performed on a module subset (e.g., an ASIC, a sub-module element, edges of the module, etc.) or on groups of modules (e.g., a detector head, detector triplets, whole detectors, etc.). As another example, the filtering of the various embodiments may be modified depending on whether the methods are performed online or offline. If performed online instead of offline, some exemplary changes include:

(1) A shorter time window (e.g., 500 ms instead of 2 sec) in order to reduce initial latency and support fast rate-changing scans (e.g., first pass).

(2) A sliding time window mechanism instead of non-overlapping sequential windows to allow "streaming" events processing.

It should be noted that the same per-module data normalization may be used and can be performed, for example, in persistence updates as well.

Additionally, upper limits for "allowed" noise may be set for an online implementation, for example, using one or more metrics as follows (with exemplary offline limits indicated in brackets):

1. Noise time in a single module [max. 20%].

2. Number of noisy modules (e.g., modules with noise time more than 0.1%) [max. 5 modules]

It should be noted that the limit values for the offline application may be determined in accordance with actual field data and the values may be changed for the online case as more data is accumulated. Moreover, if a limit is exceeded on a clinical scan, in various embodiments, the scan can be automatically extended (with a limit) until the required statistics are reached. Otherwise, an error message may be displayed to a user upon scan completion. It should be noted that the data is still filtered and saved. For example, all data may be stored to a list file with the noisy events marked. It also should be noted that in some embodiments no message is displayed to the user if noise exists, but is less than the allowed upper limits.

The various embodiments, including the filtering described herein, may be enabled, for example, for certain scans, such as clinical scans, daily and periodic QC scans (including energy and bad pixels updates), acceptance tests, etc. The various embodiments may be disabled for other procedures, for example, service/integration procedures, such as calibrations, diagnostics, Peak Histogram Acquisition (PHA), screening, etc.

Additionally, different reports may be generated showing the results of the noise filtering or testing, such as part of electronic noise criteria in a QC report. In some embodiments, an alert or warning message may be issued (e.g., displayed) to the operator if the counts rejected exceed a predetermined condition. For example, an alert or warning message may be displayed if for a specific module the normalization factor is larger than a predetermined value, such as 1.5, indicating that during more than ⅓ of the acquisition time the module was not operating properly. In other embodiments, the total ratio of noisy operation to proper operation time is calculated for the entire detector or camera, and if that ratio is above a set or predetermined value, for example 10%, an alert or warning message is issued (e.g., displayed) to the operator. In some embodiments, the analysis is performed during the acquisition, and alert is issued if a specific detector, several detectors or the entire camera is performing below an acceptable level, such as defined by the values described in more detail above.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for image noise filtering for a pixelated solid-state photon counting radiation detector, the method comprising:
   obtaining from a pixelated solid-state photon counting radiation detector image information including event count information;
   obtaining a count-rate threshold; and
   filtering the event count information based on the count-rate threshold.

2. A method in accordance with claim 1 wherein obtaining the count-rate threshold comprises determining an event-count rate based on the event count information and calculating a count-rate threshold based on the event-count rate.

3. A method in accordance with claim 1 wherein the event count information comprises event counts and timestamps and wherein the filtering comprises discarding the event counts having timestamps wherein the count-rate threshold is exceeded.

4. A method in accordance with claim 1 further comprising dividing the event count information into a plurality of time windows and determining a count-rate threshold for each time window.

5. A method in accordance with claim 4 wherein the plurality of time windows are determined by a sliding time window having overlapping time periods.

6. A method in accordance with claim 1 wherein the pixelated solid-state photon counting radiation detector comprises a plurality of modules, and wherein a count-rate threshold is calculated for each module separately.

7. A method in accordance with claim 1 further comprising normalizing the filtered event count information to compensate for the filtering.

8. A method in accordance with claim 1 wherein the event count information comprises event counts and further comprising determining a representative count-rate from which the count-rate threshold is calculated.

9. A method in accordance with claim 8 further comprising determining an acceptable deviation from the representative count-rate and calculating the count-rate threshold on the representative count-rate and the acceptable deviation.

10. A method in accordance with claim 1 wherein obtaining the count-rate threshold comprises dynamically calculating the count-rate threshold while the event count information is acquired.

11. A method in accordance with claim 1 wherein obtaining the count-rate threshold comprises calculating the count-rate threshold during an image reconstruction process after the event count information is acquired.

12. A method in accordance with claim 1 wherein obtaining the count-rate threshold comprises calculating the event count information for each of a plurality of detection periods identified by timestamps.

13. A method in accordance with claim 1 wherein the count-rate threshold is based on an expectation for Poisson distributed event count information.

14. A method in accordance with claim 1 wherein the count rate information corresponds to event counts for each of a plurality of pixels of a plurality of modules of the pixelated solid-state photon counting radiation detector.

15. A method in accordance with claim 14 wherein the plurality of modules comprise cadmium zinc telluride (CZT) modules.

16. A method in accordance with claim 1 wherein the event count information comprises one of photon event counts and x-ray event counts.

17. A method in accordance with claim 1 further comprising providing an alert if an amount of counts filtered exceeds a predetermined condition.

18. A method for noise filtering of image data, the method comprising:
acquiring image data in a count mode of a pixelated imaging detector;
determining a count-rate for the count mode image data; and
filtering, using a processor, the count mode image data based on count-rate spikes.

19. A method in accordance with claim 18 further comprising determining a count-rate threshold value to identify the count-rate spikes for filtering.

20. A method in accordance with claim 19 further comprising determining a representative count rate and a deviation from which the count-rate threshold is determined.

21. A method in accordance with claim 18 wherein the imaging detector comprises a plurality of modules and further comprising filtering the image data based on count-rate spikes in each of a plurality of time windows for each of the plurality of modules.

22. A method in accordance with claim 18 further comprising normalizing the filtered image data to compensate for the filtering.

23. An imaging system comprising:
at least one pixelated detector configured to operate in a count mode;
a processor configured to receive image data sets from the at least one pixelated detector, the image data sets including event count information; and
a noise filtering module configured to filter the event count information based on count-rate spikes determined from the event count information.

24. An imaging system in accordance with claim 23 wherein the noise filtering module is further configured to normalized the filtered image data to compensate for the filtering.

* * * * *

UNITED STATES PATENT AND TRADEMARK OFFICE
CERTIFICATE OF CORRECTION

| | |
|---|---|
| PATENT NO. | : 8,178,848 B2 |
| APPLICATION NO. | : 12/643761 |
| DATED | : May 15, 2012 |
| INVENTOR(S) | : Grobshtein et al. |

It is certified that error appears in the above-identified patent and that said Letters Patent is hereby corrected as shown below:

In Column 7, Line 13, delete "poission" and insert -- poisson --, therefor.

In Column 7, Line 17, delete "poission" and insert -- poisson --, therefor.

In Column 7, Line 24, delete "poission" and insert -- poisson --, therefor.

In Column 14, Lines 9-10, in Claim 18, delete "acquiring image data in a count mode of a pixelated imaging detector;" and insert -- acquiring, from a pixelated imaging detector in a count mode, image data; --, therefor.

In Column 14, Line 13, in Claim 18, delete "filtering, using a processor, the" and insert -- filtering the --, therefor.

Signed and Sealed this
Twentieth Day of November, 2012

David J. Kappos
*Director of the United States Patent and Trademark Office*